United States Patent [19]

Fath et al.

[11] Patent Number: 5,121,319
[45] Date of Patent: Jun. 9, 1992

[54] METHOD AND APPARATUS FOR SELECTIVE SUSPENSION AND RESUMPTION OF COMPUTER BASED MANUFACTURING PROCESSES

[75] Inventors: Janet L. Fath; Kate M. Ferriter, both of Atlanta, Ga.

[73] Assignee: International Business Machines Corporation, Armonk, N.Y.

[21] Appl. No.: 425,635

[22] Filed: Oct. 23, 1989

[51] Int. Cl.⁵ .............................................. G06F 15/46
[52] U.S. Cl. ..................................... 364/188; 364/468
[58] Field of Search ...................... 364/474.22, 474.32, 364/188–191, 468, 146, 518–521, 474.24, 474.25, 474.26; 371/19; 340/723–747

[56] References Cited

U.S. PATENT DOCUMENTS

| | | | |
|---|---|---|---|
| 4,451,895 | 5/1984 | Sliwkowski | 364/188 |
| 4,513,366 | 4/1985 | Monekata et al. | 364/188 |
| 4,530,046 | 7/1985 | Monekata et al. | 364/191 |
| 4,546,435 | 10/1985 | Herbert et al. | 364/900 |
| 4,656,603 | 4/1987 | Dunn | 364/900 |
| 4,813,013 | 3/1989 | Dunn | 364/900 |
| 4,815,000 | 3/1989 | Yoneda et al. | 364/474.32 |
| 4,823,253 | 4/1989 | Shima et al. | 364/188 |
| 4,926,311 | 5/1990 | Matsumura et al. | 364/474.22 |
| 4,943,906 | 7/1990 | Tajima et al. | 364/188 |
| 4,943,968 | 7/1990 | Hirose et al. | 371/19 |

Primary Examiner—Joseph Ruggiero
Assistant Examiner—Thomas E. Brown
Attorney, Agent, or Firm—Andrew J. Dillon

[57] ABSTRACT

A method and apparatus are disclosed for permitting the selective suspension and resumption of computer based manufacturing processes which include a plurality of manufacturing operations. A plurality of sequentially ordered textual instructions are displayed, each corresponding to a particular one of said plurality of manufacturing operations. The particular one of said plurality of manufacturing operations under current execution is determined and its corresponding textual instruction is graphically designated such that upon suspension of the manufacturing process prior to completion thereof the operation in question may be rapidly and accurately determined upon resumption of the process. In a preferred embodiment of the present invention, a graphic image of the product being manufactured is also displayed, including a plurality of reference numerals which correspond to the plurality of sequentially ordered textual instructions. The reference numeral within the graphic image which corresponds to the textual instruction under current execution is also preferably graphically designated so that the manufacturing technician may accurately resume the process.

8 Claims, 4 Drawing Sheets

SUSPENDED OPERATION REPORT

ORDER # _____ ╱⁻62

OPERATION # _____ ╱⁻64

OPERATOR _____ ╱⁻66

CELL # _____ ╱⁻68

REASON FOR SUSPENSION:
_____ ╱⁻70
_____
_____
_____

ORDERS SUSPENDED - PREFAB LINE

| ORDER # (74) | OPERATION # (76) | CELL # (78) | REASON (80) | TIME ON HOLD (82) |
|---|---|---|---|---|
| 12345 | 17A | 27B | PART #124C DEFECTIVE | 3:42 |
| 76542 | 10 | 12A | BREAK | 0:12 |
| 43151 | 15 | 06A | MISSING P/N 3714-112 | 1:17 |
| 76111 | 11 | 12A | ENGINEER REQUIRED | 0:43 |
| ⋮ | ⋮ | ⋮ | ⋮ | ⋮ |

METHOD AND APPARATUS FOR SELECTIVE SUSPENSION AND RESUMPTION OF COMPUTER BASED MANUFACTURING PROCESSES

CROSS-REFERENCE TO THE RELATED APPLICATION

The present application is related in subject matter to U.S. patent application Ser. No.07/425,786 issued, entitled "Method and System for Generation of Manufacturing Process Plans," filed of even date herewith, assigned to the assignee hereof, and incorporated herein by reference thereto.

BACKGROUND OF THE INVENTION

1. Technical Field

The present invention relates in general to improvements in manufacturing technology and in particular to improvements in manufacturing technology in computer based manufacturing process plans. Still more particularly, the present invention relates to a method and apparatus for the selective suspension and resumption of computer based manufacturing processes.

2. Description of the Related Art

Manufacturing technology has long had as its primary goal the ability to consistently produce a high quality product. Over the years, the efforts which have been made to achieve this goal have been directed primarily to the improvement of the documentation which is utilized by the manufacturing technician or floor operator during the manufacturing process. However, the rapidity with which the manufacturing process evolves often renders hard copy documentation obsolete soon after it has been distributed. The probability that the primary documentation utilized by the floor operator is either downlevel or incomplete will often result in degradation in either product quality or consistency.

As a result of the aforementioned problem, it has been a recent goal in manufacturing circles to implement the so-called "Paperless Factory." The foremost object of a Paperless Factory system is to provide high quality information on the manufacturing plant floor. High quality information in this sense is information which is current, understandable, complete and consistent. Product data currency is a key issue in those areas where manufacturing is presented with frequent Engineering Change (EC) activities. The level of detail and clarity of the information provided to the manufacturing plant floor is important and its value is clearly reflected in the quality of the physical product which is being manufactured.

There are several additional motivations for the implementation of a Paperless Factory. The most obvious motivation is the ability to provide highly current data and configuration management to the shop floor. The information being utilized by the manufacturing technician on the manufacturing shop floor in performing the manufacturing or repair operation should be the most advanced Engineering Change (EC) level available.

A well implemented Paperless Factory will also eliminate or reduce the process specifications and documentation presented in paper format to the shop floor and replace those specifications with on line operator guidance which meets the shop floor requirement of high quality current information. Another advantage of the Paperless Factory implementation is the elimination of the shear volume of hard copy information required for the manufacturing process. It is not uncommon in certain manufacturing processes to require several hundred pieces of paper for building a particular product, such as a jet aircraft.

One problem which exists in the implementation of a Paperless Factory is the inability of known computer based systems to permit the operator to temporarily suspend a selected manufacturing process. For example, a manufacturing technician may take a break, go to lunch or reach the end of his or her shift during a long cycle time operation. It is necessary, in order to preserve the quality of the product under production, for the manufacturing technician to be able to conserve the status of the process under execution. Similarly, a parts shortage or defective component may require a manufacturing technician to stop work on a particular order. While waiting for a resolution to this problem, the operator needs to remain productive by working on other orders which may be completed without delay.

In view of the above, it should be apparent that a need exists for a method and apparatus within a computer based manufacturing process system which permits the selective suspension and resumption of manufacturing processes.

SUMMARY OF THE INVENTION

It is therefore one object of the present invention to provide an improvement in manufacturing technology.

It is another object of the present invention to provide an improvement in manufacturing technology in the field of computer based manufacturing process plans.

It is yet another object of the present invention to provide an improvement in manufacturing technology which relates to methods and apparatus which permit the selective suspension and resumption of computer based manufacturing processes.

The foregoing objects are achieved as is now described. A computer system having a visual display is utilized to store a manufacturing process plan having a plurality of manufacturing operations associated therewith. A group of sequentially ordered textual instructions are displayed, each corresponding to a particular one of said plurality of manufacturing operations. The particular one of the plurality of manufacturing operations which is under current execution is determined and its corresponding textual instruction is graphically designated such that in the event of suspension of the manufacturing process the current operation may be rapidly and accurately determined upon resumption of the process. In a preferred embodiment of the present invention, a graphic image of the product being manufactured is also displayed, including a plurality of reference numerals which correspond to the group of sequentially ordered textual instructions. The reference numeral within the graphic image which corresponds to the textual instruction under current execution is also preferably graphically designated so that the manufacturing technician may accurately resume the process. A graphic indication on the visual display of the computer system is also preferably utilized to indicate to the manufacturing technician that one or more manufacturing processes have been suspended and await resumption.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a pictorial representation of a prompt screen which may be utilized upon the suspension of a manufacturing process, in accordance with the method of the present invention;

FIG. 4 is a pictorial representation of a computer screen which may be utilized to depict the status of a plurality of suspended manufacturing processes, in accordance with the method of the present invention.

DETAILED DESCRIPTION OF THE PREFERRED EMBODIMENT

Figure 1:
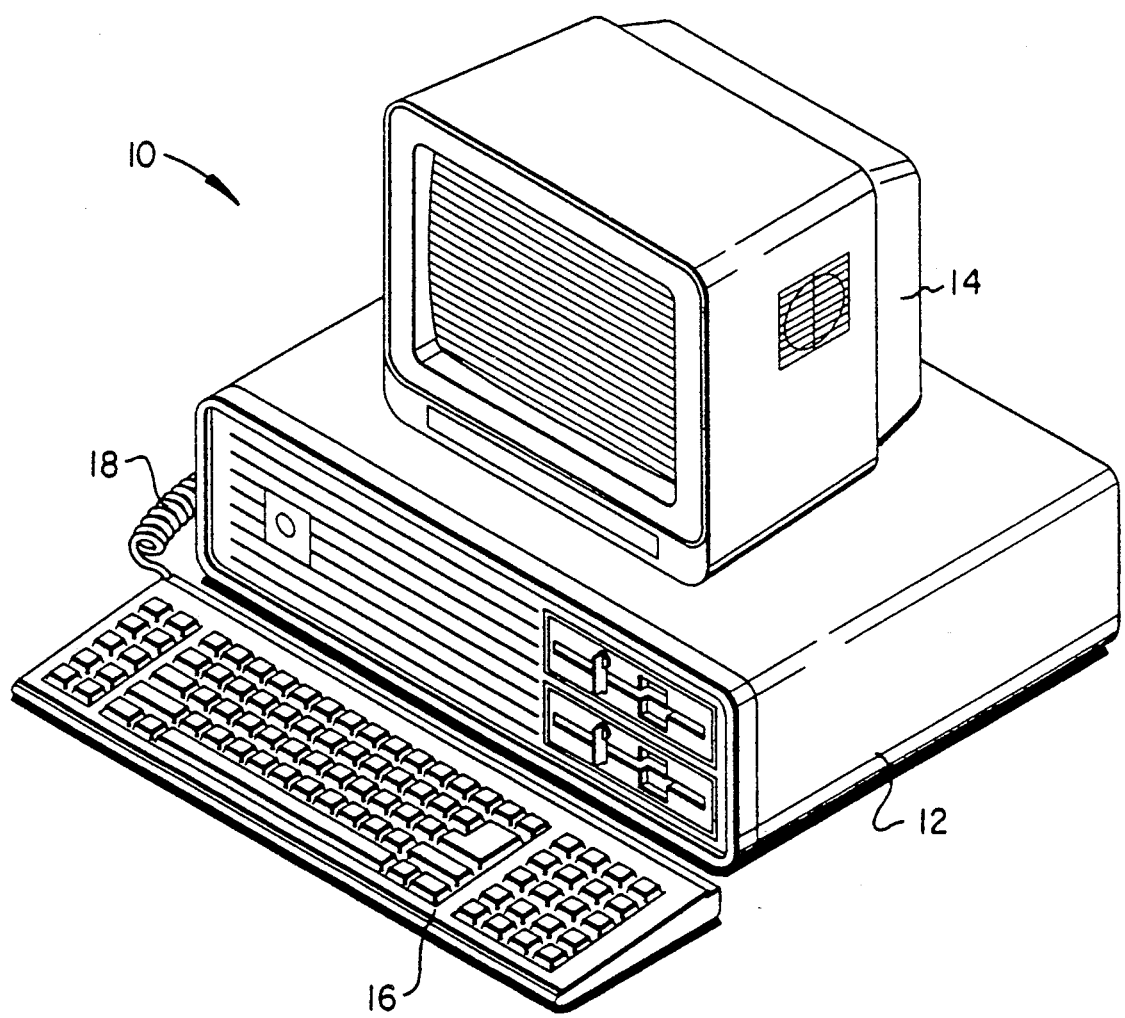
FIG. 1 is a pictorial representation of a computer system which may be utilized with the method of the present invention.

With reference now to the figures and in particular with reference to FIG. 1, there is depicted a pictorial representation of a computer system 10 which may be utilized with the method of the present invention. As may be seen, computer system 10 includes a processor 12 which preferably includes a graphics processor, memory device and a central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to processor 12 by means of cable 18.

Upon reference to the foregoing, those skilled in the art will appreciate that computer 10 may be implemented utilizing a so-called personal computer, such as the Model 50 PS/2 computer manufactured by International Business Machines Corporation of Armonk, New York.

Figure 2:
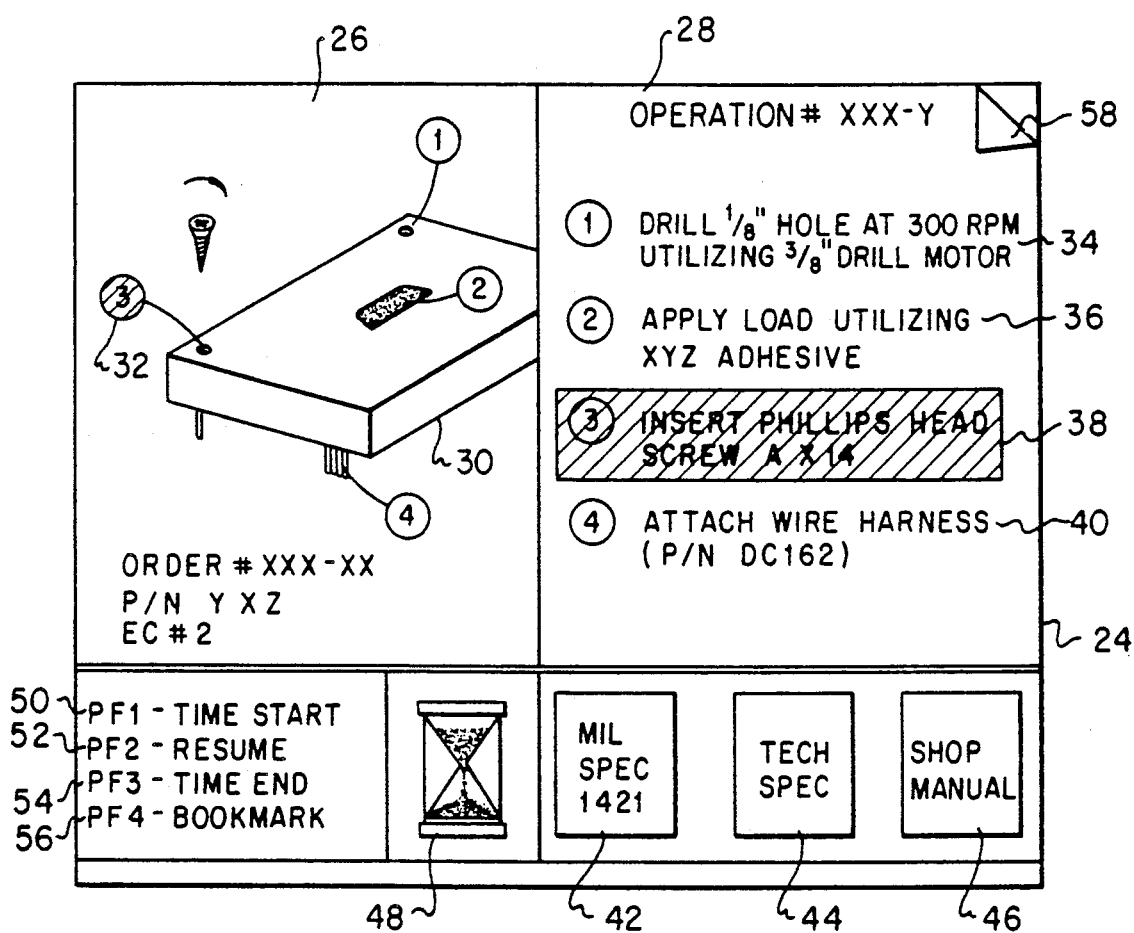
FIG. 2 is a pictorial representation of a computer screen depicting the operation of the method of the present invention.

Referring now to FIG. 2, there is depicted a pictorial representation of a computer display screen 24, which depicts the operation of the method of the present invention. As may be seen, display screen 24 has been divided into two halves, including an image half 26 and a textual instruction half 28.

Displayed visually within image half 26 of display screen 24 is an image 30 of a product which is to be manufactured by a process which is at least partially defined by numbered textual instructions 34, 36, 38, and 40, which are displayed within textual instruction half 28. As is illustrated, image half 26 of display screen 24 also preferably discloses the order number, part number and Engineering Change (EC) version of the product for which the manufacturing process is displayed. Additionally, image 30 preferably includes a plurality of reference numerals such as reference numeral 32, which corresponds to numbered textual instruction 38, thereby permitting a simple correspondence between particular textual instruction and image 30.

As is illustrated, textual half 28 of display screen 24 preferably includes a plurality of numbered textual instructions, such as textual instructions 34, 36, 38, and 40. Each textual instruction includes a sequential number which is also utilized, as discussed above, within image half 26 of display screen 24 to refer to a physical point within image 30, wherein the operation described within an associated textual instruction will take place.

As those skilled in the art will appreciate, keyboard 16 may be utilized to select a particular operation for processing by the manufacturing technician. Similarly, keyboard 16 may also be utilized to select one or more reference documents, such as reference documents 42, 44, or 46, which may be displayed in an iconic representation within display screen 24. In a manner well known in the art, the illustrated reference documents may be selected by means of keyboard 16 and expanded to permit a manufacturing technician to refer to these reference documents during the processing of a manufacturing operation.

Also displayed within display screen 24 are a plurality of commands including: TIME START; RESUME; TIME END; and BOOKMARK, referred to at reference numerals 50, 52, 54, and 56, respectively. Of course, those skilled in the art will appreciate that these commands are merely illustrative of those types of commands which may be utilized in an application of this type and that additional commands may also be utilized. As is illustrated, each command may be selected by depressing an appropriate Program Function key or, may be selected utilizing keyboard 16 (see FIG. 1) or a suitable graphical pointing device.

Referring again to display screen 24 of FIG. 2, an important feature of the method and apparatus of the present invention is illustrated. As may be seen, reference numeral 32 and textual instruction 38 have both been graphically designated by means of highlighting. Of course, those skilled in the art will appreciate that such graphic designation may take place by means of bold facing or reverse imaging. Thus, upon the selection by the manufacturing technician of command 56 (BOOKMARK), indicating that the manufacturing technician desires to suspend the manufacturing process which is currently being executed, textual instruction 38 and reference numeral 32 remain graphically designated in the manner indicated in FIG. 2. In this manner, upon the eventual resumption of the manufacturing process depicted, by means of the selection of command 52 (RESUME), the manufacturing technician may easily and accurately determine which textual instruction must be completed prior to proceeding with the manufacturing process. Another important feature of the present invention is indicated at reference numeral 58 of FIG. 2. The folded tab corner indicated at reference numeral 58 provides a simple graphic indication to the manufacturing technician that one or more manufacturing processes are currently suspended and awaiting resumption.

With reference now to FIG. 3, there is depicted a pictorial representation of a prompt screen which may be utilized upon the suspension of a manufacturing process, in accordance with the method of the present invention. As is illustrated, prompt screen 60 includes a number of data entry points which may be completed by the manufacturing technician upon his or her request for the suspension of a manufacturing process by the selection of the BOOKMARK command. For example, the manufacturing technician may enter the order number at blank 62, the operation number at blank 64, his or her operator number at blank 66 and the cell number or work station number at blank 68. An important feature of the present invention is illustrated in the requirement, at blank 70, for the manufacturing technician to enter a reason for the suspension of the manufacturing process. Of course, those ordinarily skilled in the art will appreciate that the order number, operation number, operator identification and cell number, having been previously entered into the system by the operator upon the initiation of a manufacturing process may be automatically entered into blanks 62, 64, 66 and 68 respectively by the system.

Referring now to FIG. 4, there is depicted a pictorial representation of a computer screen which may be utilized to depict the status of a plurality of suspended manufacturing processes, in accordance with the method of the present invention. As is illustrated, computer screen 72 includes a number of column headings including: order number 74; operation number 76; cell number 78; reason 80; and, time on hold 82. In this manner, the manufacturing technician or a supervisory individual may easily and simply determine the status of multiple manufacturing processes which have been suspended. This technique permits the rapid and accurate determination of manufacturing bottlenecks and allows management to easily identify major contributions to manufacturing delay, such as a large number of defective or missing parts. Additionally, as indicated at column 82, it is a simple matter for the system to continuously calculate and display the elapsed time in suspension for each manufacturing process thus reported. As those skilled in the art will appreciate upon reference to the foregoing, computer screen 72 provides a highly useful report which may be utilized to analyze the efficiency of computer based manufacturing processes throughout an entire area of production.

Figure 5:
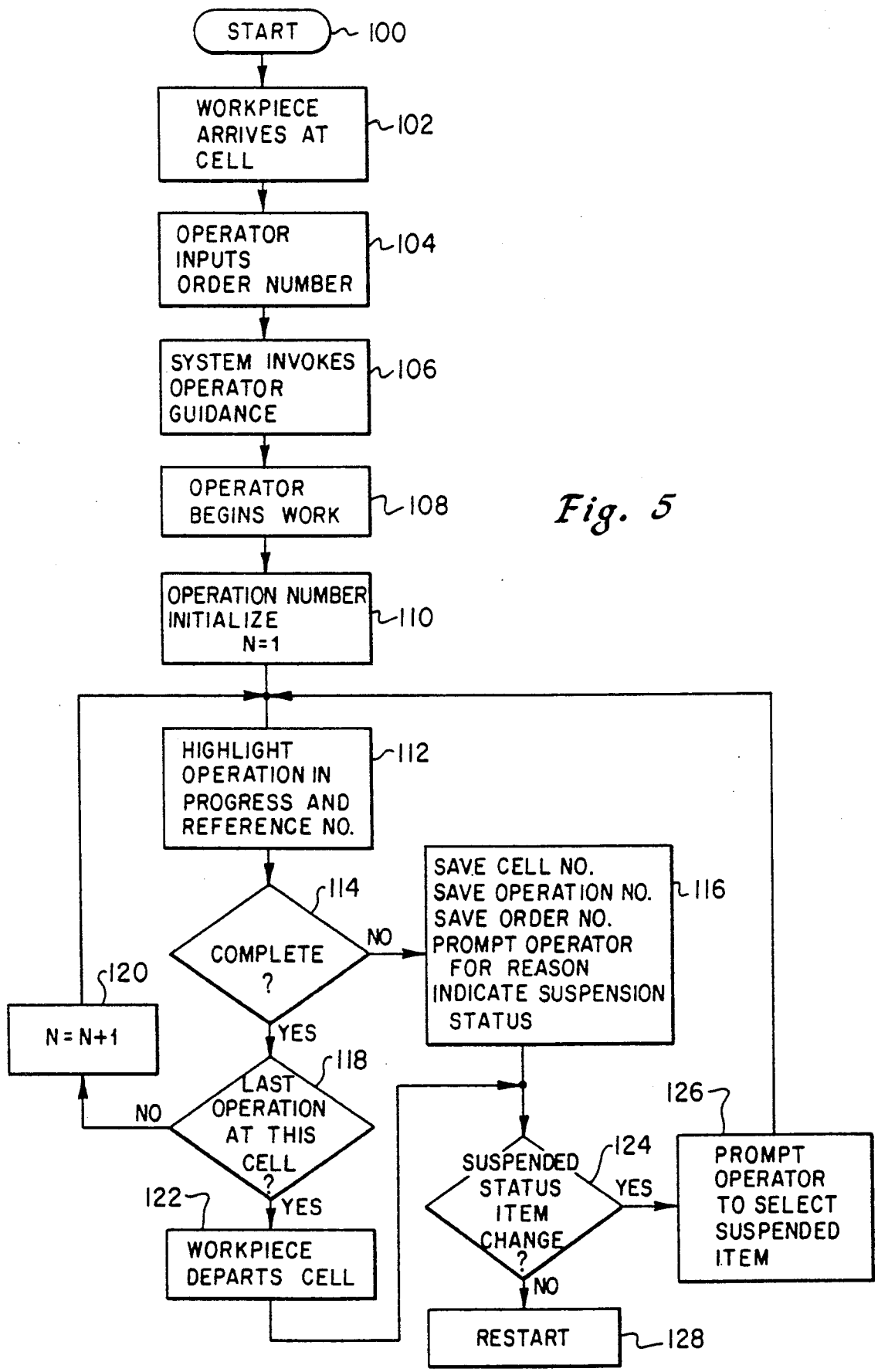
FIG. 5 is a high level logic flow chart depicting the method of the present invention.

With reference now to FIG. 5, there is depicted a high level logic flow chart depicting the method of the present invention. As is illustrated, the process begins at block 100 and thereafter passes to block 102 which depicts the arrival of a particular work piece at the cell or work station. Thereafter, the operator inputs the order number, operation number and any other additional information not previously entered into the system for this particular work station.

Block 106 then illustrates the invocation by the system of the operator guidance display. The operator guidance display is the computer based manufacturing process plan illustrated in FIG. 2 which has been created in accordance with the techniques disclosed in the cross-referenced patent application. Thereafter, the manufacturing technician begins the manufacturing process in question, as depicted in block 108.

Next, in accordance with an important aspect of the present invention, block 110 illustrates the initialization of the operation number, thereby beginning the process whereby the system determines which operation within the manufacturing process is currently under execution. Block 112 next depicts the graphic designation or highlighting of the operation in progress and any associated reference numeral which exists within the graphic image associated therewith (see FIG. 2).

At this point, block 114 is utilized to illustrate a determination of whether or not the operation which is in progress has been completed. If not, block 116 illustrates the saving by the system of the operation number, the cell number, the order number and the prompting of the operator for a reason for the suspension of this operation. Additionally, block 116 illustrates the indication of a suspended operation status, by means of the graphic indication illustrated at reference numeral 58 of FIG. 2.

Next, the process passes to block 124 which illustrates a determination of whether or not the status of a suspended item has changed and if so, block 126 illustrates the prompting of the operator to select the suspended item. Thereafter, the process returns to block 112 wherein the operation previously suspended is highlighted and displayed to the manufacturing technician. In the event there has been no change in the suspended status of any operation within the system then the process restarts, as illustrated in block 128. At this point, the operator will, of course, select a new operation to begin work.

Returning again to block 114, in the event the operator has completed the operation in progress, block 118 is utilized to determine whether or not that operation is the last operation within the manufacturing process. If not, block 120 depicts the incrementing of the operation number and the process returns to block 112 wherein the new operation in progress is highlighted. In the event the operation most recently completed is the last operation within the manufacturing process, then block 122 illustrates the departure of that work piece from the cell or workstation. Thereafter, the process returns to block 124 to determine whether or not there has been any change in the status of a suspended process, as described above.

Upon reference to the foregoing specification, those skilled in the art will appreciate that the Applicants have provided a method and apparatus whereby a manufacturing process implemented in a computer based system may be selectively suspended and resumed while accurately maintaining an indication of the particular operation which was in progress at the time of the suspension. In this manner, any manufacturing process which has been suspended may be simply and easily resumed without fear of a degradation in product quality due to the inability of the manufacturing technician to return to the process at the precise operation which was under execution at the time of the suspension. Additionally, the method and apparatus of the present invention provide an accurate method whereby the status of multiple manufacturing processes under suspension may be analyzed to provide invaluable information regarding the efficiency of the manufacturing process throughout the work area.

While the invention has been particularly shown and described with reference to a preferred embodiment, it will be understood by those skilled in the art that various changes in form and detail may be made therein without departing from the spirit and scope of the invention.

What is claimed is:

1. A method in a computer system based manufacturing process having a plurality of manufacturing operations for permitting the selective suspension and accurate resumption thereof, said method comprising the steps of:
 displaying within said computer system a plurality of sequentially ordered textual instructions, each corresponding to a particular manufacturing operation;
 displaying within said computer system a graphic image of a product to be manufactured by said manufacturing process, said graphic image including a plurality of displayed reference numerals corresponding to said plurality of sequentially ordered textual instructions;

determining in response to a user input a selected one of said plurality of sequentially ordered textual instructions which is in the process of execution; and graphically designating a selected one of said displayed reference numerals corresponding to said selected one of said plurality of sequentially ordered textural instructions and said selected one of said plurality of sequentially ordered textual instructions such that upon suspension of said manufacturing process prior to completion thereof said selected one of said plurality of sequentially ordered textual instructions may be accurately determined upon resumption thereof.

2. The method in a computer system based manufacturing process having a plurality of manufacturing operations for permitting the selective suspension and accurate resumption thereof according to claim 1 further including the step of prompting an operator of said computer system to enter selected data in response to the suspension of said manufacturing process.

3. The method in a computer system based manufacturing process having a plurality of manufacturing operations for permitting the selective suspension and accurate resumption thereof according to claim 4 wherein said selected data includes a reason for the suspension of said manufacturing process.

4. The method in a computer system based manufacturing process having a plurality of manufacturing operations for permitting the selective suspension and accurate resumption thereof according to claim 1 further including the step of storing the elapsed time between suspension of said manufacturing process and resumption thereof.

5. The method in a computer system based manufacturing process having a plurality of manufacturing operations for permitting the selective suspension and accurate resumption thereof according to claim 1 further including the step of displaying within said computer system a graphic indication of the existence of a suspended manufacturing process.

6. An apparatus for controlling a manufacturing process including a plurality of manufacturing operations, said apparatus comprising:

a computer system having a visual display;

means for storing a manufacturing process plan having a plurality of manufacturing operations with said computer system;

means for displaying a plurality of sequentially ordered textual instructions, each corresponding to a particular one of said plurality of manufacturing operation;

means for displaying a graphic image of a product to be manufactured by said manufacturing process, said graphic image including a plurality of displayed reference numerals corresponding to said plurality of sequentially ordered textual instructions;

means for determining in response to a user input a selected one of said plurality of sequentially ordered textual instructions which is in the process of execution; and means for graphically designating a selected one of said displayed reference numerals corresponding to said selected one of said plurality of sequentially ordered textural instructions and said selected one of said plurality of sequentially ordered textual instructions such that upon suspension of said manufacturing process prior to completion thereof said selected one of said plurality of sequentially ordered textual instructions may be accurately determined upon resumption thereof.

7. The apparatus for controlling a manufacturing process including a plurality of manufacturing operations according to claim 6 further including means for measuring the elapsed time from suspension of said manufacturing process to resumption thereof.

8. The apparatus for controlling a manufacturing process including a plurality of manufacturing operations according to claim 6 further including means for generating a graphic representation on said visual display indicative of the existence of a suspended manufacturing process.

* * * * *